United States Patent [19]

Douglas

[11] 4,261,596
[45] Apr. 14, 1981

[54] FOLDING UTILITY CART

[75] Inventor: Fred O. Douglas, Columbus, Ga.

[73] Assignee: W. C. Bradley Co., Columbus, Ga.

[21] Appl. No.: 35,419

[22] Filed: May 2, 1979

[51] Int. Cl.³ .............................................. B62B 1/20
[52] U.S. Cl. .................................. 280/652; 280/47.18; 280/47.33; 280/659; 403/92
[58] Field of Search ............... 280/652, 659, 653, 654, 280/655, 651, 47.18, 47.26, 47.33, 47.17, 47.24, 47.26, 79.1, 79.2, 79.3; 403/92, 93, 96, 170, 66

[56] References Cited

U.S. PATENT DOCUMENTS

| | | | |
|---|---|---|---|
| 2,938,748 | 5/1960 | Johnson | 280/654 |
| 3,166,339 | 1/1965 | Earley | 280/654 |
| 3,690,692 | 9/1972 | Florian et al. | 280/654 |
| 3,930,663 | 1/1976 | Scripter | 280/47.33 |
| 3,950,004 | 4/1976 | Olsson | 280/47.18 |

FOREIGN PATENT DOCUMENTS 1122417 9/1956 France ........................ 280/652

Primary Examiner—David M. Mitchell
Attorney, Agent, or Firm—Newton, Hopkins & Ormsby

[57] ABSTRACT

A sturdy metal folding cart is useful as a garden wheelbarrow, a wheeled dustpan, and as a stable stand for debris bags of different sizes. The cart is constructed for compact packaging and ease of assembling by a purchaser, as well as ease of folding and erecting for use. The car possesses a foldable stabilizing leg with positive locking brackets which also support the leg and form attachment points for handle components. Convenient latches for folding side and front panels are included in permanently assembled relationship with the cart.

16 Claims, 10 Drawing Figures

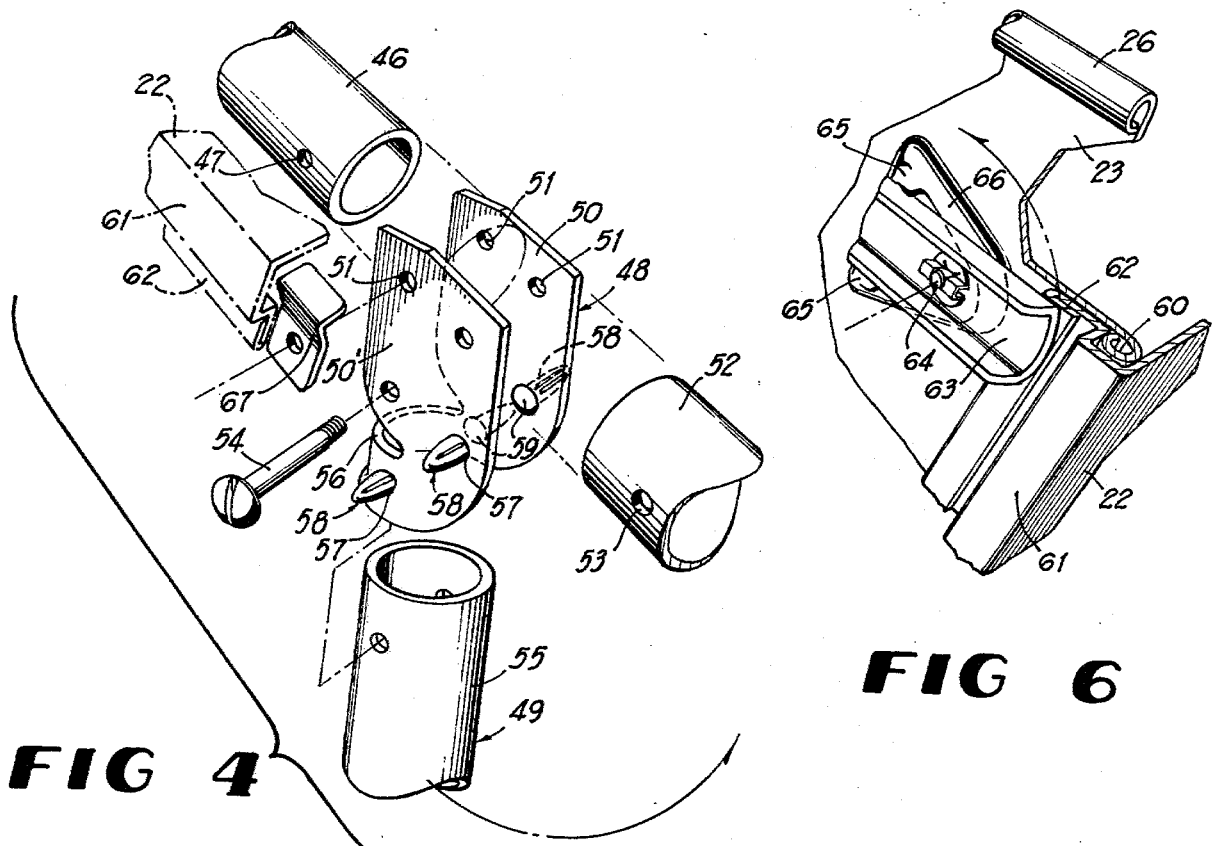
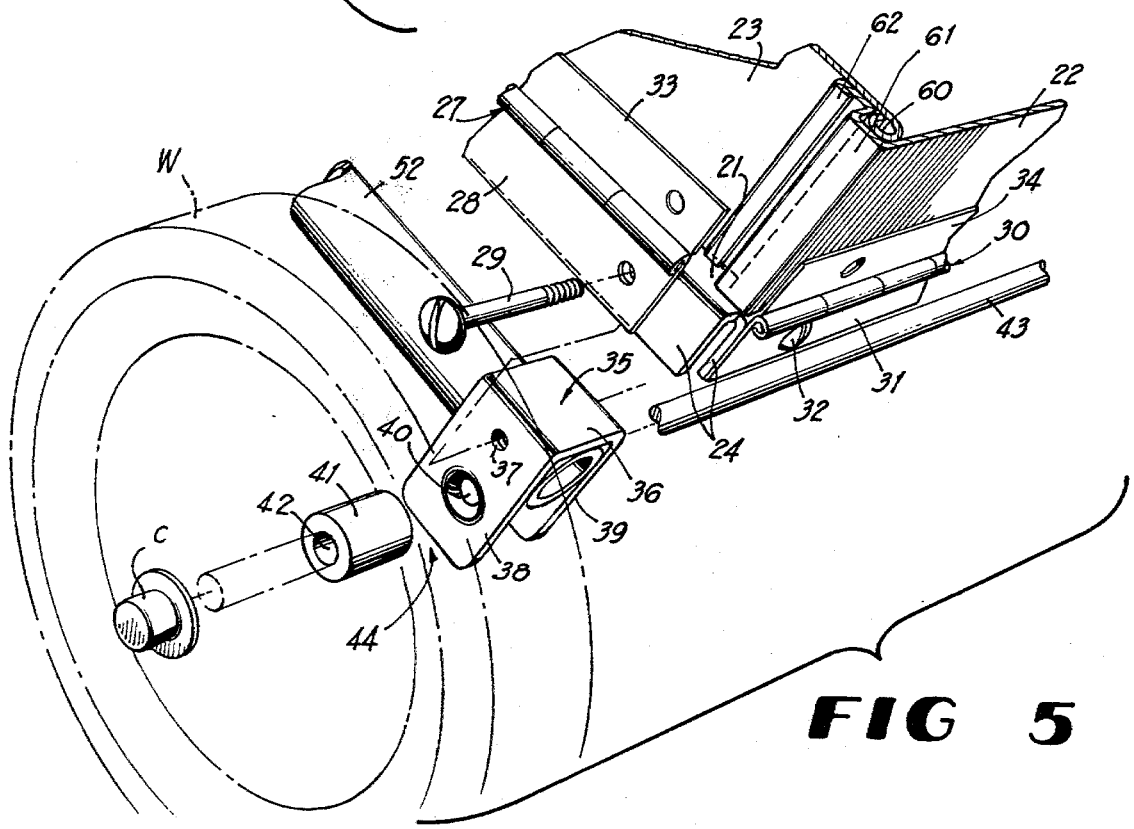

FOLDING UTILITY CART

BACKGROUND OF THE INVENTION

Folding utility carts are known in the commercial and in the patented prior art. It is the objective of the present invention to improve on the known prior art by providing a folding utility cart which is simpler and more sturdy in construction, without substantial increase in cost of manufacturing, more convenient to use by the purchaser, and capable of being packaged for shipment in a knocked-down state in a smaller package than is customarily required. The cost of packaging and the ultimate size of the package is a very important factor in the economic success or failure of a given product.

Further objectives of the invention include the provision on the back or bottom panel of the cart of downturned right angular flanges, for increased strength, and to allow the attachment of hinges and handle components at the opposite sides of the cart without the intrusion of fasteners through or inside of the body of the cart.

An important feature of the invention is the fabrication of the cart handle in three sections so that the largest handle part is smaller than the largest sheet metal component which dictates the minimum size of the packing carton which it is possible to employ.

Other features and advantages of the invention will become apparent during the course of the following description.

Some examples of the known patented prior art made of record herein under 37 C.F.R. 1.56 are the following:

| D-245,971 | 1,823,816 |
|---|---|
| 117,085 | 2,727,751 |
| | 3,552,760. |

BRIEF DESCRIPTION OF THE DRAWINGS

FIG. 4 is an enlarged fragmentary exploded perspective view of a folding leg and handle component support bracket.

FIG. 5 is an exploded perspective view of an axle bracket and associated parts, partly in section.

FIG. 6 is a fragmentary perspective view of a cam latch for folding panels.

DETAILED DESCRIPTION

Figure 1:
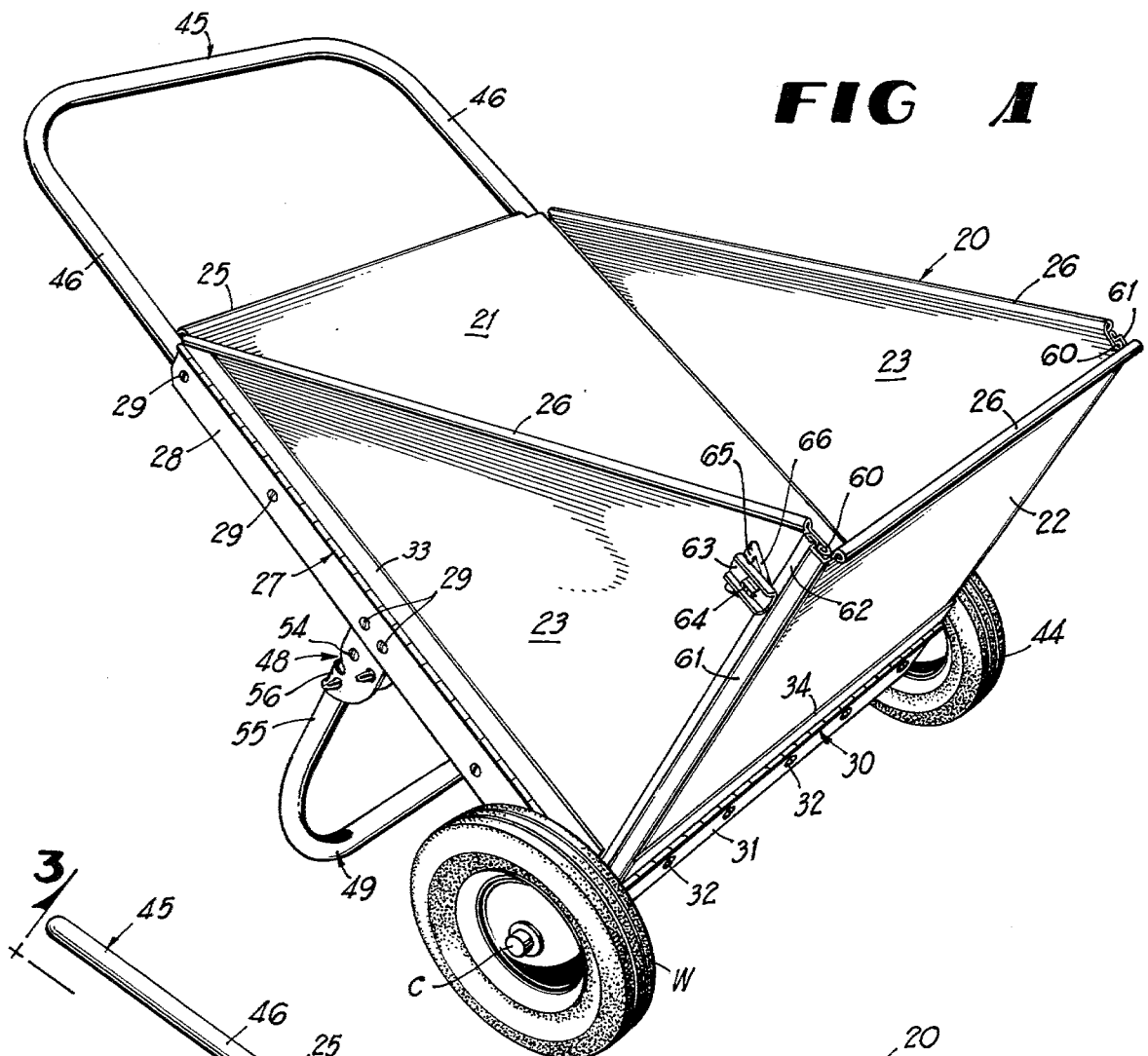
FIG. 1 is a perspective view of the invention in erected form ready for use.

Referring to the drawings in detail wherein like numerals designate like parts, a preferably metal utility cart 20 is depicted comprising a rectangular bottom panel or wall 21, a forward rectangular hinged folding wall 22 and a pair of opposite side triangular folding walls 23 which are parallel and vertical when the cart is in an erected state.

In the interest of rigidity, the bottom wall 21 is provided at its opposite sides and on its leading end with right angular downturned flanges 24 of equal widths and being substantially continuous around three of the marginal edges of the cart bottom wall. The upper rear edge of the bottom wall 21 is formed with a rounded bead 25. The top edges of the forward and side walls 22 and 23 also carry rounded beads 26, as indicated in the drawings.

Figure 3:
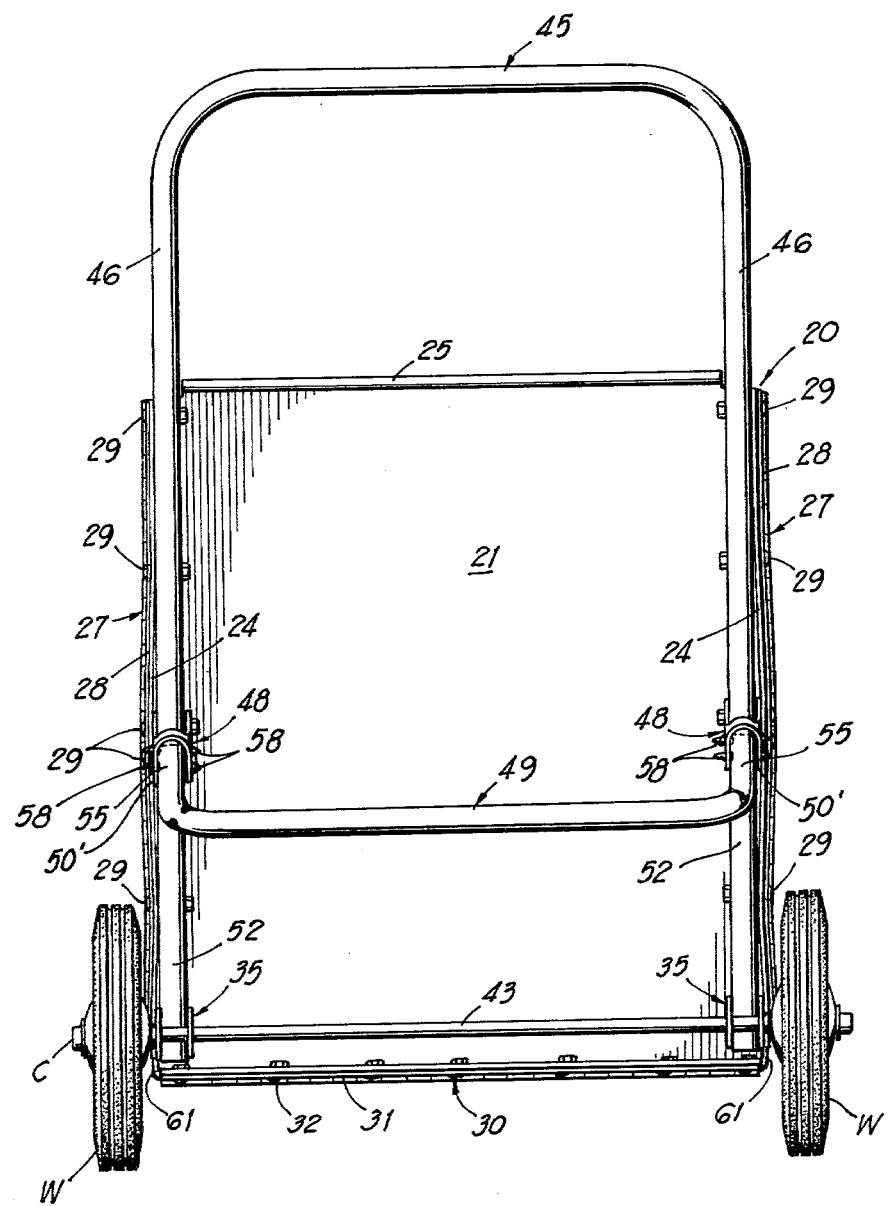
FIG. 3 is a bottom plan view taken substantially on line 3—3 of FIG. 2.

Side longitudinal hinges 27 for the folding cart sides 23 have their lower leaves 28 attached by bolts 29 to the exterior faces of the side flanges 24 of bottom wall 21, FIGS. 3 and 5. Similarly, a transverse hinge 30 for the folding forward wall 22 has one leaf 31 thereof attached by bolts 32 to the forward transverse flange 24 of bottom panel or wall 21. The upper leaves 33 and 34 of the respective hinges 27 and 30 are suitably attached to the outer faces of folding walls 23 and 22. It may be noted, as a feature of the invention, that the bolts 29 and 32 lie below the plane of the bottom wall 21 of the cart, and therefore do not intrude into the interior of the utility cart body.

Figure 2:
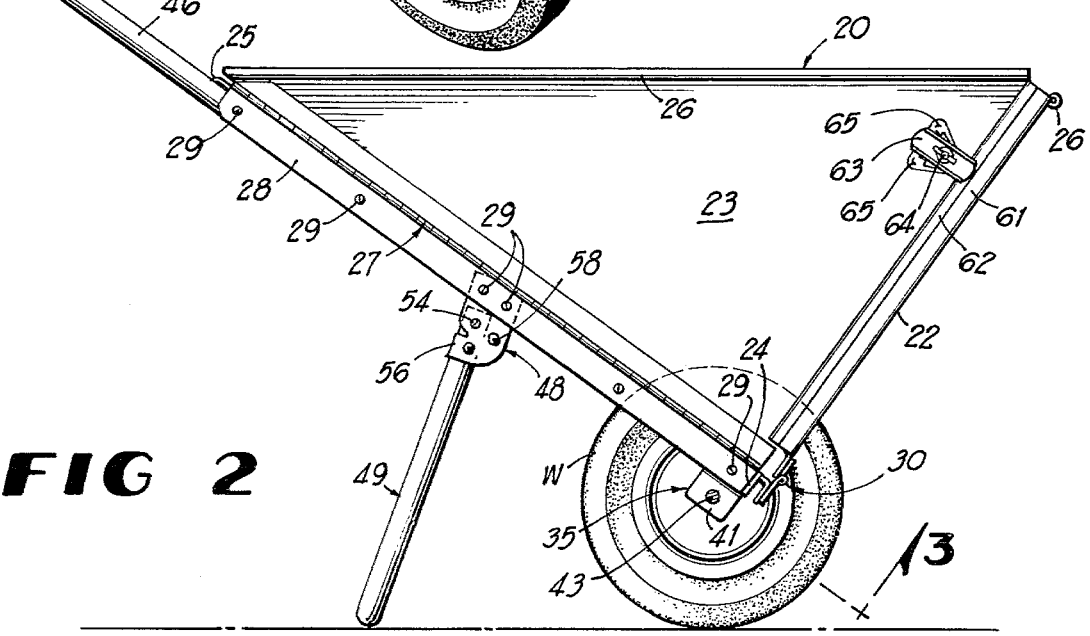
FIG. 2 is a side elevation of the invention.

A pair of inverted "U" shaped axle brackets 35 are provided substantially at the forward end of bottom wall 21 and immediately below it. A crowned section 36 of each axle bracket 35 engages immediately inwardly of the adjacent downturned flange 24 in abutting relation therewith and also in abutment with the bottom face of the wall 21. The brackets 35 have apertures 37 in their downturned vertical walls 38 and 39 to receive therethrough one of the aforementioned bolts 29 which anchor the brackets 35 and lower portion of hinges 27 to the flanges 24 at the sides of the bottom wall 21. Spaced below the apertures 37 on walls 38 and 39 are mounting openings 40 for a front transverse axle 43 which is received through support openings in the bracket walls 38 and 39. Outboard of wall 38 in abutment with each bracket 35 is a cylindrical wheel spacer 41 apertured at 42 to receive the transverse axle 43. This spacer 41 and bracket 35 form an integral bracket assembly 44. The transverse axle 43, as shown in FIG. 2, is located slightly below the lower edges of flanges 24 and adjacent hinges 27 and slightly rearwardly of the plane of folding front wall 22. Suitable wheels W are conventionally journaled on the opposite end portions of the axle 43 outwardly of the brackets 35 and spacers 41 near the outer extremeties of the cart side walls secured thereto by hub caps C in frictional engagement with the end portions of axle 43.

A rear U-shaped tubular handle 45 for the utility cart has its opposite parallel sides 46 extending immediately inwardly of the side flanges 24 on bottom wall 21 and along the same in close relation to the under surface of bottom wall 21. The handle sides 46 are secured at several points along their lengths by the bolts 29 and are transversely apertured for this purpose at 47, FIG. 4. Opposite side support brackets 48 for the forward extremeties of handle sides 46 also support adjustably and lockingly a folding U-leg 49 at the bottom of the cart and rearwardly of its wheels W and near its longitudinal center. The brackets 48 constitute a unique feature of the invention in that they serve several different purposes, and also contribute to the ability of the cart in a knocked-down state to be packaged in the smallest possible carton, not shown, whose length and width are determined by the dimensions of the bottom wall 21 which is the largest component of the cart.

Each bracket 48 has spaced parallel side walls 50 having pairs of aligned apertures 51 near their tops. The outer walls 50' of brackets 48 lie immediately inwardly of side flanges 24 in the assembled cart. The forward ends of handle sides 46 engage between the bracket walls 50 and their forwardmost openings 47 register with the rear pair of apertures 51 and receive therethrough one of the aforementioned bolts 29, as indicated in FIG. 1 and elsewhere.

The cart handle includes forward side extensions 52 coaxial with the sides 46 and forming continuations thereof but divided from the sides 46 at the centers of the brackets 48. The rearward ends of handle extensions 52 have transverse apertures 53 adapted to register with the forward apertures 51 of brackets 48 and to receive therethrough additional bolts 29, as shown. The forward and rear end faces of adjacent handle portions 46 and 52 are in substantial abutment at the centers of the brackets 48 and cannot rotate around the axes of the bolts 29 attaching them to the brackets.

As shown in FIG. 5 and in FIG. 3, the forward extremities of handle extensions or sections 52 are received under the crowns 36 of axle brackets 35 and locked therein by other bolts 29, FIG. 2, passing through the apertures 37 and registering apertures at the leading ends of extensions 52. The arrangement is very strong, highly compact and the handle sides, except at the rear of the cart and their attaching means, are substantially concealed, FIG. 1. By interrupting the handle sides 46 at the mounting brackets 48, the largest section of the handle, namely the U-section 45, is rendered smaller in length and width than the cart bottom wall 21, and thus a smaller shipping carton for the knocked-down components can be utilized, as previously explained.

The two brackets 48 also serve to pivotally support the folding U-leg 49 which has the tops of its parallel sides pivoted to the brackets 48 by pivot bolts 54 somewhat below the level of the bolts 29. As best shown in FIG. 4, the tops of leg sides 55 are received in lower parts of brackets 48 which project below the hinges 27 and flanges 24 and include rear half-circle walls 56 which stabilize U-leg 49 in its active supporting position as shown in FIG. 2, where the leg is angled at somewhat less than 90 degrees to the bottom wall of the cart. The leg stabilizing wall 56 of each bracket 48 is below the level of pivot bolt 54. The forward side of each bracket 48 is open so that the pivoted leg 49 can swing forwardly and upwardly to a stowed position at the bottom of the cart.

Two-way locking means for the U-leg 49 is provided in the following manner. Each bracket 48 is suited with a pair of apertures 57 to receive inserts 58 spaced radially at approximately 90° spacing about leg pivot bolts 54. The inserts are of nylon or the like material so as to resiliently and biasly engage the apertures 57 through which they are inserted and also to render a wear resistant surface to the head 59 of the insert 58. These head portions 59 of the insert 58 form a pair of protuberances within the channel formed by the "U" of the bracket 48, within which the leg may be selectively positioned. By virtue of this arrangement, the leg 49 is releasably lockable in its extended and folded positions. It is now apparent that the brackets 48 serve as anchors for the ends of divided handle parts 46 and 52, as pivot supports and stabilizers for the folding leg 49, and as two position releasable locks for the leg 49.

At their forward edges, the cart side walls 23 have outwardly projecting beads 60 thereon adapted to interfit with upturned channel extensions 61 formed on the opposite sides of forward wall 22. Inwardly stepped lips 62 immediately rearwardly of beads 60 and channel extensions 61 abut the outer faces of side walls 23 in the erected cart. The interlocking relationship of the beads 60 and channel extensions 61 is clearly shown in FIGS. 5 and 6.

Figure 7A:
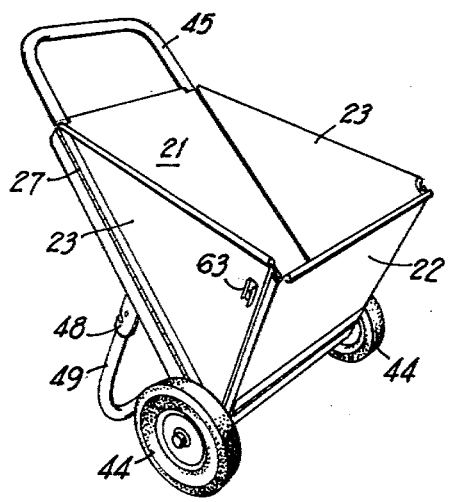
FIGS. 7A through 7E are partly diagrammatic perspective views depicting the steps of folding the utility cart to a compact state.
Figure 7B:
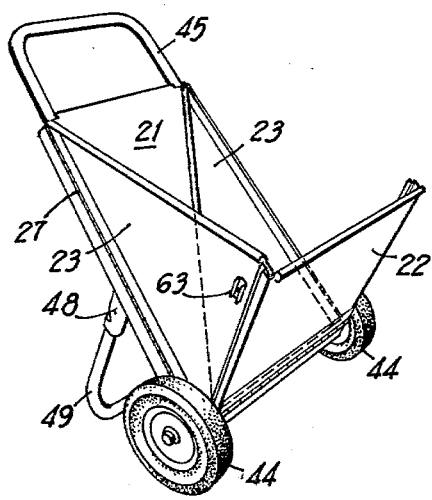

To releasably secure the several hinged walls 22 and 23 in erected relationship, a pair of twist cam latches 63 is positioned on the outer face of each side wall 23 near its forward upper corner. The twist cam latches are permanently assembled with the side walls 23 on a twist axis element 64 to prevent separation and loss. In their active latching positions, FIGS. 1, 2 and 6, corresponding ends of the latches 63 lap the outer sides of lips 62 so that the side walls 23 cannot fold inwardly and the forward wall 22 cannot fold or swing on its hinge axis. In this active position, the opposite end of each latch 63 is locked by a pair of raised detents 65 at the opposite ends of a gradually sloping cam face 66 on each side wall 23. A simple 90 degree twisting action of the latch 63 will move it to the release position, FIG. 7A, free of engagement with the lip 62.

Figure 7C:
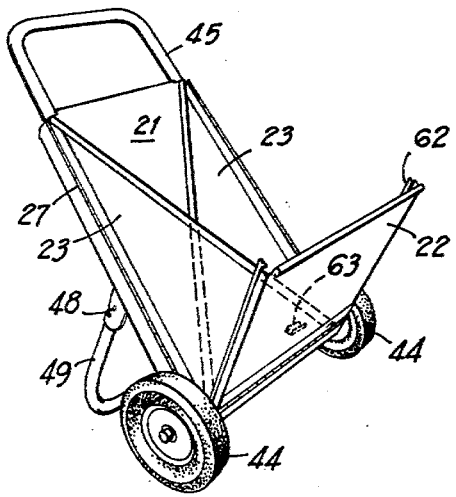
Figure 7D:
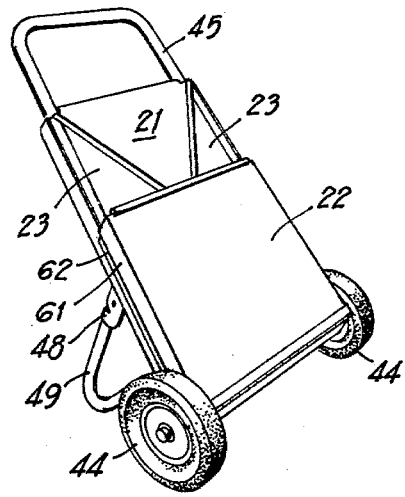
Figure 7E:
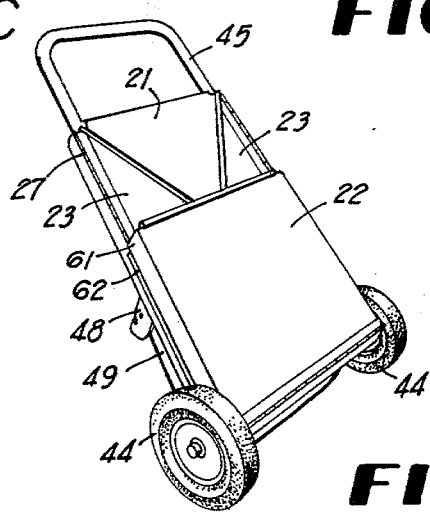

Referring briefly to FIGS. 7A through 7E, the sequence of folding steps of the cart is shown. Initially, FIG. 7A, the two latches 63 are twisted and released from the lips 62 of forward wall 22. Following this, in FIG. 7B, the two side walls 23 are separately folded inwardly and downwardly to lie flat upon the top face of bottom wall 21, which condition is shown in FIG. 7C. Following this, FIG. 7D, the forward wall 22 is folded rearwardly or inwardly to lie flat upon the folded side walls 23 with the channel extensions 61 and lips 62 overlapping the side edges of the underlying structure. Finally, as shown in FIG. 7E, the cart stabilizing leg 49 is folded forwardly and upwardly beneath the bottom wall 21 and the locking protuberances 59 will engage a portion of the leg 49 to retain it in its forward-most collapsed and folded position.

An optional feature of the invention is also shown in FIG. 4 only and may be omitted if desired. This feature is the provision of a spring locking tab 67 on one or both sides of the cart to releasably interlock with the lip 62 when the cart is folded for storage. As shown in FIG. 4, the spring locking tab 67 is attached to the outer side of one or both brackets 48 by one of the bolts 29. In lieu of the locking tab 67, the lips 62 can be constructed to engage lockingly over the knuckles of side hinges 27 when the forward wall 22 is folded, as in FIG. 7E. Either arrangement will maintain the cart folded until the user wishes to again erect if for use.

Figure 8:
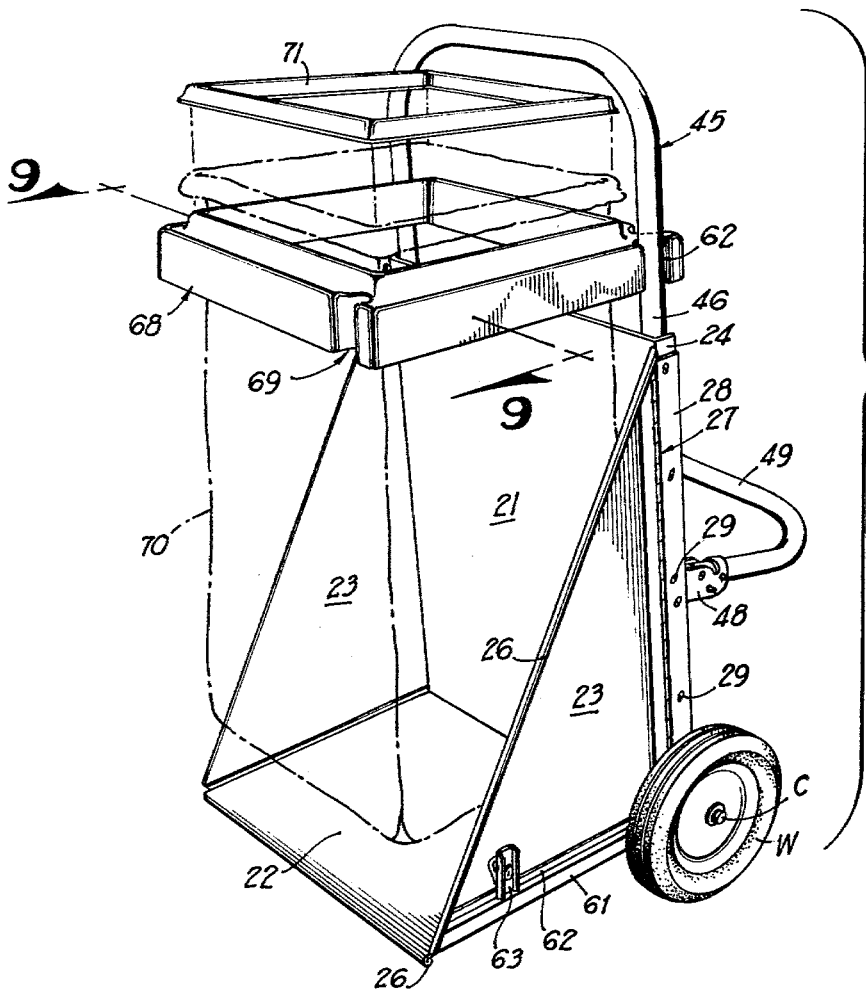
FIG. 8 is a perspective view of the cart as used for picking up sweepings and for supporting a bag for debris.
Figure 9:
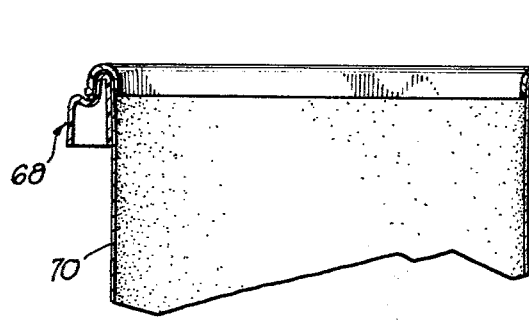
FIG. 9 is a vertical section taken on line 9—9 of FIG. 8.
Figure 10:
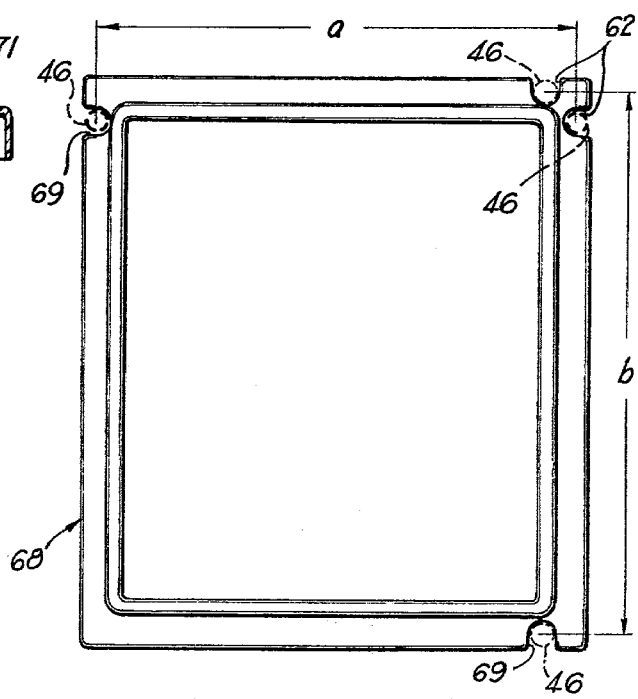
FIG. 10 is a plan view of a bag support frame employed with the cart.

FIGS. 8 through 10 depict a further capability of the invention. The position of the axle 43 affords good ground clearance during pushing or pulling of the cart and also allows the cart to stand substantially vertically as shown in FIG. 8 for use as a sweepings collector.

An adjustable bag holder in the form of a rectangular plastic frame 68 has corner notches 69 preferably on two different center distances a and b, FIG. 10. One pair of the notches 69 snappingly receive the parallel sides 46 of handle 45 so that the bag frame can be supported and positioned at the desired height on the upright cart. The other set of notches 69 can accommodate a handle having a slightly different width. The frame 68 is readily adjustable upwardly and downwardly on the cart and will be held by friction at the selected height. Standard plastic refuse bags 70 have their open ends folded back over the top of the frame 68 and a cooperating clamping frame 71 is then brought to bear on the mouth of the bag to clamp it securely. By adjusting the height of the frame 68, different bag sizes can be accommodated with the bottom of each bag resting properly on the forward panel 22 which is now level.

The invention is characterized by strength, economy of manufacturing and packaging, ease of assembly by the purchaser, and convenience of use for a variety of purposes. There are no loose parts to be lost and the device collapses or folds for storage in a minimum space.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A folding utility cart of the class having a fixed bottom wall, downwardly folding side and forward walls, a pair of transverse axle supported wheels near the forward wall, a handle including spaced parallel sides projecting from the rear of the bottom wall and an upwardly folding support leg for the cart having spaced parallel sides and disposed rearwardly of said wheels and below said bottom wall, the improvement comprising downturned flanges on the opposite side and forward edges of the bottom wall, hinges for said folding side and forward walls disposed on the outer faces of the side downturned flanges and being fixed to the folding side and forward walls, axle brackets disposed beneath said bottom wall near its forward edge and at the inner faces of the side downturned flanges and supporting the axle of the cart at an elevation near and below said downturned flanges, cooperative support brackets for said handle and leg sides spaced rearwardly of the axle brackets and on the interior faces of the side downturned flanges, said cooperative support brackets having generally right angular socketing parts for said handle and leg sides, the handle sides being discontinuous and being formed in coaxial rear and forward sections, the forward terminals of the rear sections and the rear terminals of the forward sections of the handle sides being engaged in one socketing part of each cooperative support bracket above said leg sides, said leg sides being engaged within the other socketing parts of said cooperative support brackets and being pivoted to such brackets, the forward terminals of said forward sections of the handle sides being engaged with the axle brackets, both sections of the handle sides lying inwardly of the side downturned flanges and below said fixed bottom wall, and spaced fasteners securing said side downturned flanges, said axle brackets, said cooperative support brackets, said forward and rear sections of the handle sides and said hinges in assembled relationship, said fasteners being disposed beneath the lower face of said fixed bottom wall.

2. A folding utility cart as defined in claim 1, and cooperative detent means on said leg sides and cooperative support brackets for releasably locking said leg in extended and folded positions.

3. A folding utility cart as defined in claim 2, and said other socketing parts of the cooperative support brackets including rearwardly stabilizing walls for said leg in the extended position thereof, the forward sides of said other socketing parts being open to allow forward and upward folding of said leg.

4. A folding utility cart as defined in claim 1, and manually operated latching means on said cart to releasably secure said downwardly folding side and forward walls erected.

5. A folding utility cart as defined in claim 4, and said latching means comprising twist latches having positioning detents on the outer faces of said folding side walls, said folding forward wall having rearwardly directed side lips lapping forward edge portions of the side walls and adapted to be lapped by said twist latches in the active latching positions of the latter.

6. A folding utility cart as defined in claim 5, and said folding side walls and forward wall having interlocking parts forwardly of said lips and latches which are engaged when said folding walls are latched in their erected positions.

7. A folding utility cart as defined in claim 6, and said interlocking parts comprising outwardly projecting beads carried by the forward edges of the side walls and cooperating outwardly formed channels carried by the side edges of the forward wall immediately forwardly of said lips.

8. A folding utility cart as defined in claim 1, and spring latch means at least on one side of the cart for releasably holding said folding side and forward walls in folded relationship.

9. A folding utility cart as defined in claim 8, and said spring latch means comprising a spring latch element on the outer side of at least one of said cooperative support brackets positioned to interlock with said folding forward wall when the latter is in its fully folded position.

10. A folding utility cart as defined in claim 1, and each axle brackwet having a crown portion disposed inwardly of one side downturned flange of the bottom wall and receiving therein the forward terminal of one forward section of a handle side, one of said spaced fasteners passing through the crown portion of each axle bracket.

11. A folding utility cart as defined in claim 10, and each axle bracket assembly further comprising an outward extension at a lower elevation than the crown portion and lying immediately beneath one side downturned flange and having a transverse axis aperture for the support of the axle of said cart.

12. A folding utility cart as defined in claim 1, and a refuse bag suspension frame for use with said cart when the latter is turned upright with its forward wall arranged lowermost and substantially level, said frame having corner notches adapted to receive said handle sides adjustably above the upright body portion of the cart.

13. A folding utilitity cart of the class having a fixed bottom wall, downwardly folding side and forward walls, a pair of transverse axle supported wheels near the forward wall, a handle including spaced parallel sides projecting from the rear of the bottom wall and an upwardly folding support leg for the cart having spaced parallel sides and disposed rearwardly of said wheels and below said bottom wall, the improvement comprising downturned flanges on the opposite side and forward edges of the bottom wall, hinges for said folding side and forward walls disposed on the outer faces of the side downturned flanges and being fixed to the folding side and forward walls, axle brackets disposed beneath said bottom wall near its forward edge and at the inner faces of the side downturned flanges and supporting the axle of the cart at an elevation near and below said downturned flanges, cooperative support brackets for said handle and leg sides spaced rearwardly of the axle brackets and on the interior faces of the side downturned flanges, the handle sides being discontinuous and being formed in coaxial rear and forward sections, and spaced fasteners securing said side downturned flanges, said axle brackets, said cooperative support brackets, said forward and rear sections of the handle sides and said hinges in assembled relationship, said fasteners being disposed beneath the lower face of said fixed bottom wall and exteriorally of all of the walls of said cart thereby providing smooth interior wall surfaces.

14. A folding utility cart as defined in claim 13, and said cooperative support brackets having generally right angular socketing parts for said handle and leg sides, the forward terminals of the rear sections and the rear terminals of the forward sections of the handle sides being engaged in one socketing part of each cooperative support bracket above said leg sides.

15. A folding utility cart as defined in claim 14, and said leg sides being engaged within the other socketing parts of said cooperative support brackets and being pivoted to such brackets.

16. A folding utility cart as defined in claim 15, and the forward terminals of said forward sections of the handle sides being engaged with the axle brackets, both sections of the handle sides lying inwardly of the side downturned flanges and below said fixed bottom wall.

* * * * *